May 19, 1953          D. G. KERWIN          2,639,312

INSULATING FLEXIBLE SPLICER CORE FOR PLURAL CABLE JOINTS

Filed March 5, 1949          2 Sheets—Sheet 1

INVENTOR.
Daniel G. Kerwin
BY
Atty.

May 19, 1953  D. G. KERWIN  2,639,312
INSULATING FLEXIBLE SPLICER CORE FOR PLURAL CABLE JOINTS
Filed March 5, 1949  2 Sheets-Sheet 2
Fig. 9.
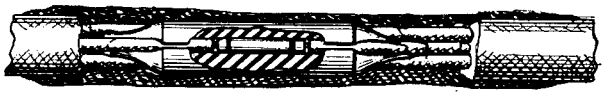
 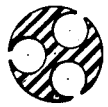 
Fig. 10.  Fig. 11.  Fig. 12.
  
Fig. 13.  Fig. 14.  Fig. 15.
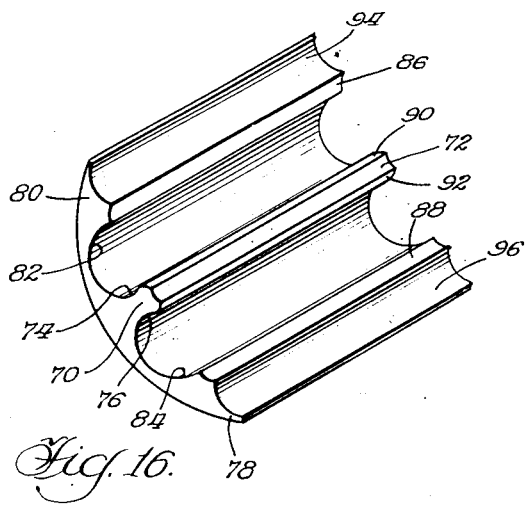
Fig. 16.
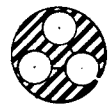
Fig. 17.
INVENTOR.
Daniel G. Kerwin
BY
Atty.

Patented May 19, 1953

2,639,312

UNITED STATES PATENT OFFICE 2,639,312

INSULATING FLEXIBLE SPLICER CORE FOR PLURAL CABLE JOINTS

Daniel G. Kerwin, Chicago, Ill.

Application March 5, 1949, Serial No. 79,859

2 Claims. (Cl. 174—138)

This invention relates to a splicer core, a term which applicant has adopted to identify a strip of insulation material having outwardly directed, parallel grooves in which is positioned spliced electrical conductors of spliced cables.

At the present time there are two standard cable splices, the hand splice and the vulcanized splice. The vulcanized splice will be described first. Referring to Fig. 1, the splicer first cuts back the outer wrappings of each cable such as 10 (a two-conductor cable) to expose the insulated conductors 12 and 14. He then bares the copper strands 16 and 18 and joins them by a copper sleeve 20 which he crimps at, for example, 22 and 24 with a crimping tool. The sleeve has a small hole 26 in its wall into which the splicer may pour solder. He may then repeat these steps for the conductors 14 and 28, seeking to make the length of spliced conductors 14 and 28 exactly equal to the length of spliced conductors 12 and 13. Usually, he first winds tape 30 of fully cured rubber around the conductors 12 and 13 because it is easier to wind the tape 30 while the conductors 14 and 28 are still unspliced. He repeats the tape-winding operation on spliced conductors 14 and 28, but it is difficult to do a neat job because he must push the tape end repeatedly between the spliced conductors. The regular taping shown in Fig. 2 is difficult to attain and slow and the difficulty and time consumed increases as the number of conductors in a cable increases.

The first object of this invention is to provide a method and means for eliminating this winding of tape through the opening between two conductors.

Thereafter, the splicer winds a tape 32 of semicured rubber around all conductors after which he adds several layers of tape 34 of uncured rubber, as illustrated in Fig. 2. The splicer freely uses a liquid cement during tape-winding operations. The splice is now placed in a vulcanizing apparatus. This apparatus is schematically illustrated in Fig. 3 for the purpose of explaining why tapes of various cures are used. If uncured rubber is substituted for the fully cured tape 30, the molds 36 and 38 may press the conductors into engagement with each other during vulcanizing and shorts will develop.

The second object of this invention is to provide a splicer core of nonconductive material which will hold the conductors at a predetermined minimum distance from each other in either a hand splicer or a vulcanized splicer.

The steps in making a hand splice are the same as those described for the vulcanized splice excepting that fully cured rubber tape is used throughout and friction tape is used as an outside protection.

The qualities of these two splices are very dependent upon the workmanship of the splicer, and this is particularly true of hand splices. Frequently, the finished splice resembles a great knot.

The third object of this invention is to provide a neat splice.

Ancillary objects of this invention include: the provision of splicer cores for cables having various numbers of conductors therein and splicer cores in which the grooves for holding the conductors have various diameters; the provision of beveled ends or biased ends on splicer cores to minimize separation of the ends of the core from the respective adjacent ends of the cables resulting from flexing of the spliced cable; and the provision of cores divided transversely into sections each having a conductor groove therein for more readily assembling the core in a splice.

These and such other objects as may hereinafter appear are attained in several embodiments of the invention disclosed in the accompanying drawings wherein:

Fig. 9 is a side elevation of a splicer core having long tapered ends;

Figs. 10, 11 and 12 are sectional views of applicant's splicer cores designated for two-conductor, three-conductor, and four-conductor cables;

Figs. 13, 14 and 15 are cross sectional views of applicant's sectional splicer cores;

Fig. 16 is a perspective view of a splicer core having encircling wing members for enclosing the conductors, and shown in expanded position; and, Fig. 17 is a cross sectional view of this same core in closed position.

Figure 1:
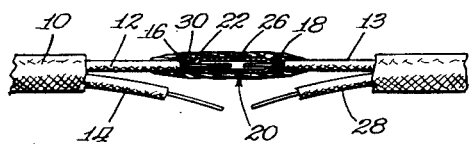
Figs. 1 through 3 illustrate steps in making a standard hand or vulcanized cable splice today.
Figure 2:
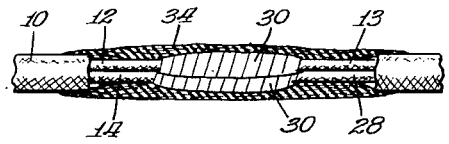
Figure 3:
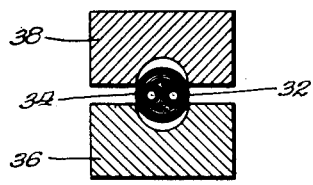
Figure 4:
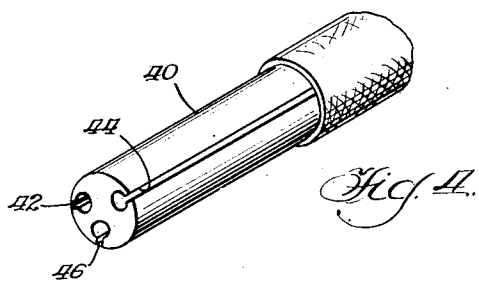
Fig. 4 is a perspective view of one of applicant's fixed-length splicer cores abutted to the end of a cable, the conductors being omitted.

Continuing to refer to the drawings, the numeral 40 in Fig. 4 identifies a cylinder of cured rubber having three longitudinal, semi-closed grooves or tubular chambers connected to the surface by a slot or slit, 42, 44 and 46. This constitutes applicant's splicing core. For shop repairing, these cores may be supplied in fixed lengths or sizes. Some will have two grooves, others three, or more. For field repairing, the core may be provided in three-foot lengths.

Figure 5:
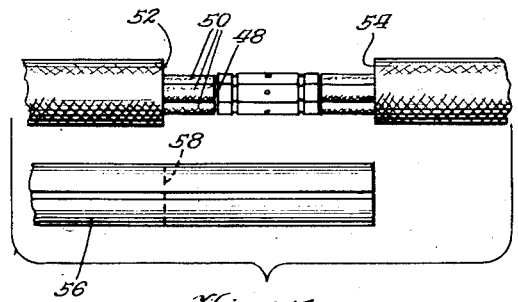
Fig. 5 is a view of a spliced, three-conductor cable with the conductors joined and illustrating how a length of applicant's core may be cut off preparatory to insertion between the conductors in the cable.

The method of making a splice is as follows. Referring to Fig. 5, the strands 48 of the insulated conductors 50 are bared and the ends 52 and 54 of the cables are cut along a plane as nearly at right angles to the cable axis as possible. The strands are spliced to each other so that the conductors are of approximately equal lengths, thereby holding the ends 52 and 54 in substantially parallel planes. The splicer then positions adjacent the spliced cable the splicer core 56 so that he may cut, as at 58, a core to fit quite exactly between the two ends 52 and 54.

Figure 6:
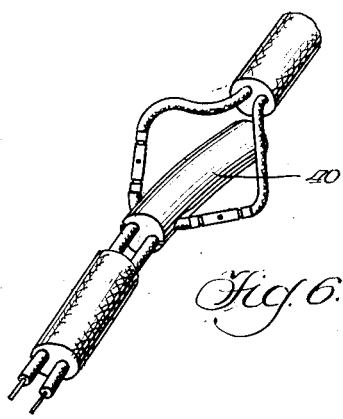
Fig. 6 is a perspective view illustrating how applicant's core is positioned between the conductors.

The ends 52 and 54 are next drawn toward each other, thereby spreading the conductors as illustrated in Fig. 6. The splicer core 40 is inserted and forced into position, the core being made of cured rubber but quite flexible. It will be noted that the outside diameter of the core is substantially less than the outside diameter of the cable. The splicer then wraps the core with a rubber tape 60, see Fig. 7, to provide a smooth surfaced splice. If the splice is to be vulcanized (there is field equipment for such vulcanizing), tape 60 will be of uncured rubber, and the splicer will probably wrap uncured rubber into any space 62 (Fig. 7) between a cable end and the end of the splicer core and he will overlap the tape 60 over the ends of the cable, as at 64. If the splice is to be unvulcanized, the tape 60 will be cured rubber and a layer of friction tape will be added.

Figure 7:
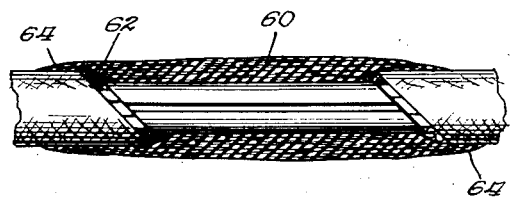
Fig. 7 is a side elevation of a fixed-length, biased-end splicer core.

The splicer core illustrated in Fig. 7 is similar to that core heretofore described excepting that the ends of the core are cut on a bias and the ends of the cable are cut on a similar bias. For those cables that will not be flexed at the splice, the core illustrated in Figs. 4 to 6 is the best, but where the cable is one that will be flexed, as a cable connected to a portable machine, the joints between the cable ends and the splicer core ends may open, unless vulcanized. A splice made with the bias splicer core illustrated in Fig. 7 is less subject to this objection.

Figure 8:
Fig. 8 is a side elevation of a fixed-length, splicer core having tapered ends.

The cores illustrated in Figs. 8 and 9 are particularly adapted to prevent the opening of the joints between the ends of the cable and the ends of the splicer core. In Fig. 8, the ends of the splicer core are beveled and the splicer similarly bevels the cable ends. He can then wrap tape tightly into the resulting annular channel and as the tape overlaps both the core and cable ends, there will be less likelihood of separation. The splicer cores of Figs. 8 and 9 are particularly adapted to hand splicing.

The core illustrated in Fig. 9 is also advantageous in that it is more readily inserted between the conductors. The insertion of a core having a length approximating the spacing of the cable ends can be simplified by inserting the core after one conductor (or two if a three-conductor cable) has been spliced, and by then splicing the remaining conductor in the groove of the splicer core. Crimping the sleeve is a little difficult.

Figs. 10, 11 and 12 are cross sections of splicer cores for two-, three- and four-conductor cables. These sectional views show that the facing edges of each groove are very close to each other so as to insulate the conductors externally as well as from each other.

In Figs. 13, 14 and 15, there are shown three sectional splicing cores. In Fig. 13, the core consists of two units each having a cross section consisting of a semi-circle with a groove outwardly directed therein. A single core section would be used for making the two-part core. Similarly, the core, in Fig. 14, would consist of three sections, all identical, wherein the back of each core would be formed by two plain surfaces intersecting at an angle of 120 degrees. In the core shown in Fig. 15, the cross section of each core member would be a quadrant of a circle. These sectional cores are advantageous in that they can be more easily mounted between spliced conductors of a cable.

In Figs. 16 and 17, applicant illustrates a modified form of core. The core 70 carries very shallow grooves 72, 74 and 76, but in this embodiment the core is connected to wings or flaps 78 and 80. This is a three-conductor core and a full circle around each conductor is obtained by continuing the grooves 74 and 76 along the lines 82 and 84. The walls 86 and 88 on folding the wings engage the walls 90 and 92 respectively of the core. The walls 94 and 96 are sections of cylinders and this core assembles into the cross section illustrated in Fig. 17. This core 70, can be quickly inserted between the conductors after all of the conductors have been spliced because the diameter of the core 70 is very small. The core is made of cured rubber which is sufficiently flexible to permit its being expanded into the form illustrated in Fig. 16. Basically, the idea is the same as the other splicer cores illustrated because it is the central core 70 which spaces the conductors from each other.

The preferred embodiment of the invention is that shown in Figs. 4 and 8. Applicant will make splicer cores of a selected length and formed of fairly hard, nonconductive, flexible material such as cured rubber, or formed of some fairly rigid material such as a hardened plastic with open-sided grooves. Instead of cutting a strip of splicer core to fit the space between the ends of spliced cables, the splicer will splice the conductors so that the cable ends will fit the splicer core. The cores will contain grooves for two to four conductors. Cores and grooves of various diameters may be provided. However, a large number of different cores will not be needed. The vast amount of cable splicing work is done on two- or three-wire cables in which the range in diameters of the conductors that are spliced is comparatively small.

Having thus described his invention, applicant claims:

1. The method of splicing two, multi-conductor cable ends to each other which comprises the steps of squaring the ends of the cable, splicing pairs of bare conductors to each other so that when the cable ends are drawn apart a selected distance there will be a plurality of substantially parallel conductors, and of forcing between the spliced conductors a flexible, elastic insulating core having a length slightly less than the distance between the cable ends while concurrently forcing the conductors into surface grooves in the elastic core.

2. A splicing core for multi-conductor cable splicing comprising an elongated block of flexible, non-conductive material, each end of the block being tapered to a substantially smaller diameter, a plurality of open-ended chambers spaced from each other around the longitudinal axis of the block and parallel thereto, and a split connecting each chamber to the adjacent surface of the block throughout the entire length of the chamber.

DANIEL G. KERWIN.

References Cited in the file of this patent

UNITED STATES PATENTS

| Number | Name | Date |
|---|---|---|
| 472,933 | O'Connor | Apr. 12, 1892 |
| 1,113,138 | Penote | Oct. 6, 1914 |
| 1,146,717 | Klenk | July 13, 1915 |
| 1,940,917 | Okazaki | Dec. 26, 1933 |
| 2,108,031 | Acuff | Feb. 15, 1938 |
| 2,267,630 | Weiland | Dec. 23, 1941 |
| 2,284,097 | La Jone | May 26, 1942 |
| 2,287,096 | Friend | June 23, 1942 |

FOREIGN PATENTS

| Number | Country | Date |
|---|---|---|
| 483,714 | Great Britain | Apr. 25, 1938 |